United States Patent [19]

Alley et al.

[11] 4,097,962

[45] Jul. 4, 1978

[54] MACHINE FOR CONTINUOUS PUMPING OF PLASTIC MATERIALS

[75] Inventors: Lewis F. Alley, Kansas City, Mo.; James E. White, Overland Park, Kans.

[73] Assignee: Marlen Research Corporation, Overland Park, Kans.

[21] Appl. No.: 708,624

[22] Filed: Jul. 26, 1976

[51] Int. Cl.² ............................................. A22C 7/00
[52] U.S. Cl. ............................................. 17/39; 17/38
[58] Field of Search .................................. 17/35–39, 17/33; 308/2, 72; 74/594; 403/131, 135, 76

[56] References Cited

U.S. PATENT DOCUMENTS

| 78,555 | 6/1868 | Troxell | 17/38 |
|---|---|---|---|
| 736,720 | 8/1903 | Hahn | 17/38 |
| 1,573,150 | 2/1926 | Fay | 17/35 |
| 2,766,079 | 8/1903 | Browne | 403/131 |
| 2,991,711 | 7/1961 | Ehrhard et al. | 101/126 |
| 3,014,767 | 12/1961 | Thrasher et al. | 308/72 |
| 3,108,318 | 10/1963 | Miller et al. | 17/39 |
| 3,456,285 | 7/1969 | Miller et al. | 17/39 |
| 3,627,389 | 12/1971 | Foote, Jr. et al. | 308/72 |
| 3,876,087 | 4/1975 | Osta | 101/216 |

FOREIGN PATENT DOCUMENTS 144,791  6/1920  United Kingdom ..................... 17/39

Primary Examiner—Louis G. Mancene
Assistant Examiner—Paul J. Hirsch
Attorney, Agent, or Firm—Schmidt, Johnson, Hovey & Williams

[57] ABSTRACT

A compact, yet easy-to-clean machine has a pair of pumping plungers that reciprocate alternately to force plastic materials, such as food products, out of their respective pump chambers and into a common delivery conduit, thereby effecting substantially continuous operation. Each plunger has a chamber-defining sleeve associated therewith which precedes the plunger into the product supply so as to load the sleeve in readiness for the oncoming plunger. The plungers and their sleeves are operated by a common control and operating pack of hydraulic power devices and pneumatic limit switches located behind the plungers and sleeves within the cabinet of the machine, and the pack is journaled on the cabinet by spherical bearings which enable the pack and the plungers and sleeves to be cocked upwardly as a unit out of the cabinet into an access position for cleaning. Two spherical bearings are provided, one for each of the plungers, and they are axially aligned with the plungers so as to receive the rearward thrust thereof at the most favorable locations for structural reliability.

5 Claims, 13 Drawing Figures

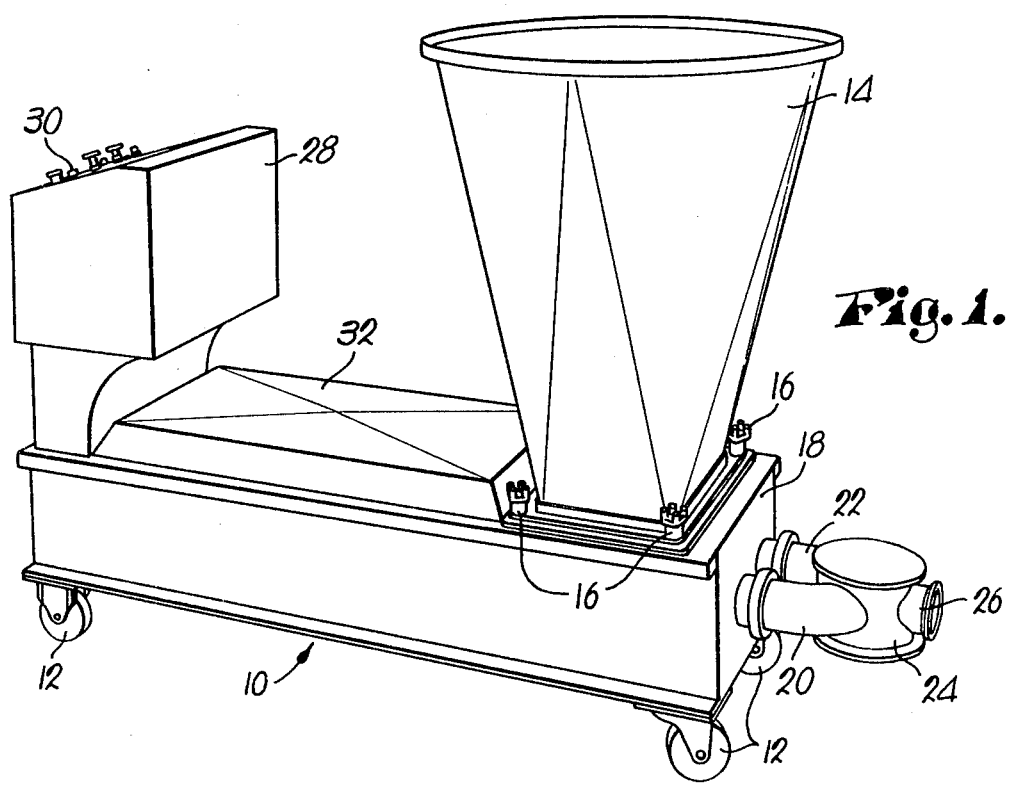
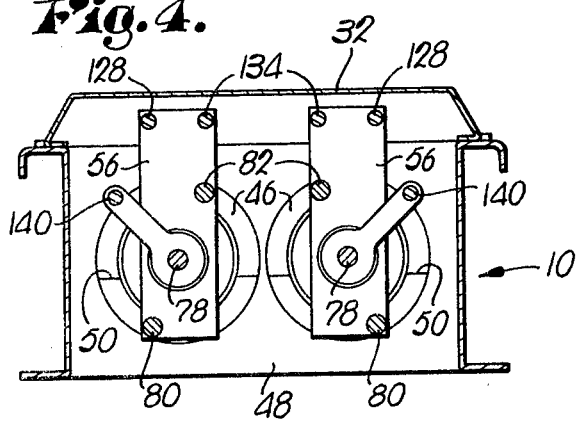
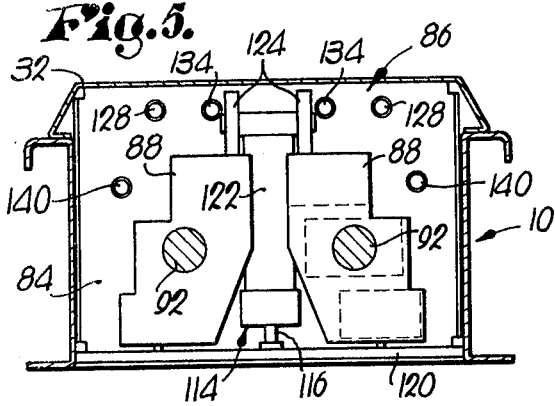
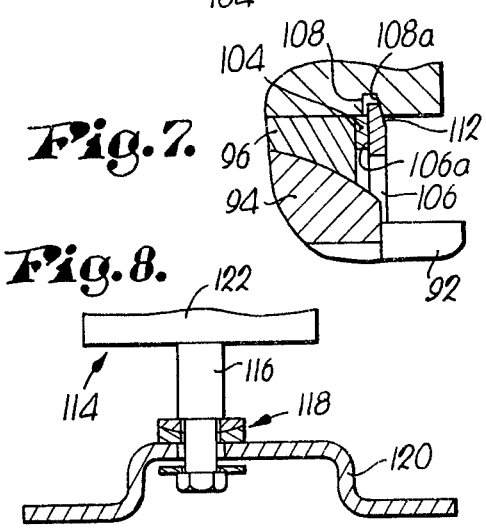

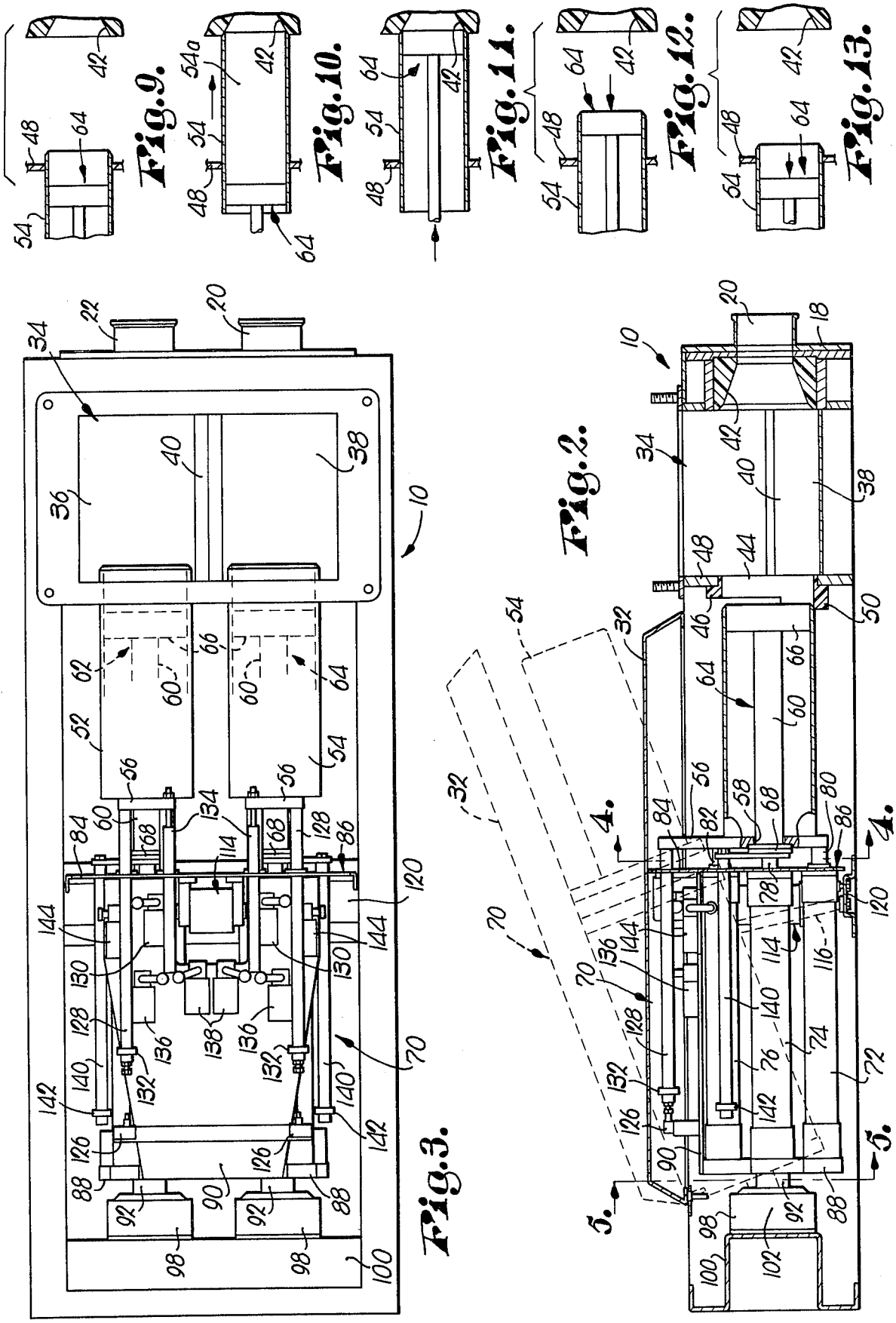

MACHINE FOR CONTINUOUS PUMPING OF PLASTIC MATERIALS

This invention relates to improvements in a machine of the type illustrated in the Miller, et al U.S. Pat. Nos. 3,108,318 and 3,456,285, assigned to the assignee herein. These patents are hereby incorporated by reference into the present specification for a full and clear understanding of the present invention.

Both of the foregoing patents are directed to a machine which is capable of pumping plastic materials, such as food products, on a substantially continuous basis. This is accomplished by virtue of a pair of alternately reciprocating plungers which discharge into a common conduit. As one plunger is moving forwardly, such as to pump products from the machine, the other is retracting in readiness for the next cycle, and vice versa. Each plunger operates in conjunction with its own sleeve which reciprocates relative to the plunger into and out of a loading area that has been filled with product. When the sleeve moves through the product and seals against an endwall surrounding the outlet, a loaded pumping chamber is thereby effectively defined through which the plunger can advance to force the confined product from the machine. This basic principle of operation has been extremely successful and has received worldwide acclaim throughout the industry.

Accordingly, one important object of the present invention is to provide certain improvements over and above the machines described and claimed in the incorporated patents without sacrificing or in any way adversely affecting the basic principles of operation which have made machines of this type so successful.

Another important object of this invention is to provide a compacted, consolidated version of the machines of the aforementioned patents which, notwithstanding its compactness and consolidation, is nonetheless highly conducive to rapid, thorough cleaning so as to meet the highest standards of sanitation.

A further important object of this invention, without sacrificing the immediately foregoing attributes, is to provide for increased structural stamina at the point where the major operating components of the machine are mounted for swinging movement to an access position to facilitate such sanitizing.

These and other important objects of the present invention will become apparent from the following description and claims wherein:

FIG. 1 is a left front perspective view of a machine embodying the principles of the present invention;

FIG. 2 is an enlarged, vertical cross-sectional view of the machine illustrating in phantom lines the manner in which the operating and control pack, as well as the plungers and sleeves of the machine, may be raised to a cocked position for sanitizing;

FIG. 3 is a top plan view thereof with the cover removed to reveal details of construction;

FIG. 4 is a transverse vertical cross-sectional view of the machine taken along line 4—4 of FIG. 2;

FIG. 5 is a transverse vertical cross-sectional view thereof taken along line 5—5 of FIG. 2;

FIG. 6 is an enlarged detailed view of a typical spherical bearing mounting at the rear end of the machine;

FIG. 7 is a further enlarged, fragmentary detailed view illustrating the way in which such bearings are mounted on the cabinet of the machine;

FIG. 8 is an enlarged, fragmentary detailed view of the mounting arrangement for the lift cylinder for the operating and control pack; and FIGS. 9, 10, 11, 12 and 13 are diagrammatic views on a reduced scale illustrating the pumping operation of the machine.

Referring initially to FIG. 1, the machine has a cabinet 10 provided with wheels 12 that enable the machine to be moved readily from place to place within the food processing plant or other installation. A large, upright hopper 14 rises from one end of the cabinet 10 to receive a supply of food products or other plastic materials to be pumped, the hopper 14 being removably attached to the cabinet 10 through a series of suitable fasteners 16. One endwall 18 of the cabinet 10 has a pair of discharge conduits 20 and 22 which converge into a common manifold 24 having a single outlet conduit 26. A suitable flapper valve (not shown) housed within the manifold 24 opens and closes alternate ones of the discharge conduits 20 and 22 such that they are alternately communicated with the conduit 26 in the manner explained in detail in the incorporated patents. A control console 28 rises from the opposite end of the cabinet 10 and carries a number of suitable operating buttons and other controls for regulating the operation of the machine.

As illustrated in FIGS. 2-5, the cabinet 10 is basically open-top, although the latter is normally closed by a cover 32 and the hopper 14. A receptacle 34 is located within the cabinet 10 directly below the hopper 14 and has a pair of generally semi-cylindrical, side-by-side compartments 36 and 38 which are separated by a short, upwardly projecting partition 40 extending in the direction of product discharge. Each of the compartments 36, 38 has a funnel-shaped outlet 42 (FIG. 2) which communicates with the corresponding conduits 20 and 22. The opposite end of each compartment 36, 38 has an inlet 44 that communicates the receptacle 34 with the interior of the cabinet 10, each of the inlets 44 being defined by an annular insert 46 carried by a transverse wall 48. As illustrated best in FIG. 2, each of the inserts 46 has a rearwardly projecting peripheral ledge 50.

The ledges 50 of the inserts 46 support the forwardmost ends of a pair of normally horizontal sleeves 52 and 54 which are coaxially aligned with the inlets 44 and outlets 42 of the compartments 36, 38, respectively. At their rearmost ends, the sleeves 52 and 54 are attached to separate, upright, rectangular members 56, both of which are imperforate except for generally centrally disposed, horizontal apertures 58 that slidingly receive the rams 60 of plungers 62 and 64, the former being housed within the sleeve 52 and the latter within the sleeve 54. Each plunger 62, 64 has a head 66 which can extend no further than the forwardmost end of its corresponding sleeve 52 or 54, as a result of a collar 68 at the rear of ram 60 which is disposed for limiting engagement with the upright member 56.

An operating and control pack 70 is located within the cabinet 10 behind the sleeves 52, 54 and the plungers 62, 64 for the purpose of actuating the same. The pack 70 includes three hydraulic power devices 72, 74 and 76, for the sleeve and plunger on each side of the cabinet 10, respectively, and because of the identity of power arrangements for the two sides of the machine, such will be described with reference to the plunger 64 and the sleeve 54 only. The hydraulic device 74 is coaxially aligned with the plunger 64, and the piston rod 78 of the device 74 is connected to the ram 60 of the plunger 64 in the area of the collar 68.

This coaxial relationship is illustrated well in FIG. 4 in which it may also be seen that the piston rods 80 and 82 of the devices 72 and 76, respectively, are disposed below and above the rod 78 on opposite lateral sides thereof. The rods 80 and 82 are secured to the upright member 56 whereby the push or pull of the devices 72 and 76 is transmitted to the sleeve 54.

All three devices 72, 74 and 76, as well as the corresponding devices for the sleeve 52 and the plunger 62, are attached at their forward ends to a common transverse plate 84 which forms a part of a support frame 86 of the pack 70. Another part of the frame 86 comprises the separate, stair-step blocks 88 (FIG. 5) at the rear of the pack 70, each of which rigidly mounts a set of the devices 72, 74 and 76. A top plate 90 of generally trapezoidal configuration overlies all of the devices 72, 74 and 76 and bridges the transverse plate 84 and the rear blocks 88.

Each of the blocks 88 has a stud 92 projecting rearwardly therefrom in coaxial alignment with the power device 74 and the corresponding plunger 62 or 64. The stud 92, in turn, rigidly carries a spherical bearing 94 (FIGS. 6 and 7) which is journaled by an annular race 96. The race 96, in turn, is carried within a mount 98 attached to a rear endwall 100 of the cabinet 10. As a result of this arrangement, the pack 70 is adapted for vertical swinging movement about a horizontal, transverse axis 102 which intersects the centers of the spherical bearings 94, the sleeves 52, 54 and the plungers 62, 64, of course, being swingable with the pack 70. As illustrated in FIG. 2, these components are swingable as a unit between the lowered operating position shown in full lines and the cocked, access position illustrated in phantom lines.

As shown in FIG. 7, each spherical bearing 94 and race 96 is retained in its mount 102 through the use of a washer 104 that encircles the bearing 94 and bears against the race 96 along its forwardmost surface 96a. A split ring retainer 106 on the forward side of the washer 104 projects into an annular groove 108 in the mount 98 such that the bearing 94, race 96 and washer 104 are captured between the rear surface 106a of split ring 106 and a rearmost, annular shoulder 110 of the mount 98, as illustrated in FIG. 6. Note that the forward side 108a of the groove 108 is inclined complementally to a bevel 112 on the corresponding side of the split ring 106. Thus, during wear between the bearing 94 and the race 96, the resilient split ring 106 automatically expands diammetrically along the side 108a progressively deeper into the groove 108 to compensate for such wear.

As illustrated in detail in FIGS. 5 and 8, the pack 70 is provided with a hydraulic lifting unit 114 having a rod 116 that is pivotally attached through a loose fastening assembly 118 to the central part of a transverse, upwardly projecting rib 120 on the floor of the cabinet 10. The cylinder 122 of the unit 118 has its upper end pivoted to a pair of upright ears 124 which are, in turn, rigidly affixed to the rear face of the transverse plate 84. Hence, the pack 70 may be powered between its lowered and cocked positions.

The hydraulic cylinder devices 72, 74 and 76, as well as the hydraulic lifting unit 114, are, of course, coupled with a pressurized source of hydraulic fluid (not shown). The hydraulic circuitry for regulating these components has not been illustrated herein, nor have the electro-mechanical components which operate in conjunction with such circuitry, but it is to be understood that this aspect of the machine corresponds closely in principle to that illustrated in the two incorporated patents. Some of the controls are, of course, housed within the console 28 for activation by the buttons 30. Others, comprising a series of pneumatic limit switches, are carried by the top plate 90 directly beneath the cover 32, and these will now be described in some detail.

A pair of safety switches 126 are located on opposite lateral sides of the top plate 90 adjacent the rear end of the latter and are disposed for engagement and actuation by a pair of corresponding, fore-and-aft extending rods 128. The rods 128 are secured at their forward ends to the members 56 and extend slidingly through the transverse plate 84. The rods 128 are, thus, mounted for movement with their corresponding sleeves 52 and 54, and the lengths of the rods 128 are such that they will actuate the switches 126 when the sleeves 52 and 54 are fully retracted, as illustrated in FIG. 2. (Parenthetically, it should be noted that the position of the sleeves 52 and 54 in FIG. 2 is slightly rearwardly of that illustrated in FIG. 3.)

When the sleeves 52 and 54 are fully retracted as in FIG. 2, complete overhead clearance is provided such that the pack 70, the sleeves 52, 54 and the plungers 62, 64 can be raised to the cocked position as illustrated in phantom in FIG. 2. The switches 126 are, thus, used to control the flow of pressurized hydraulic fluid to the hydraulic lifting unit 114, and only when the sleeves 52 and 54 are fully retracted can such activation of the unit 114 occur.

Another pair of switches 130 adjacent the front of the top plate 90 are disposed for actuation by collars 132 on the rods 128. These switches 130 are, thus, actuated in response to movement of the sleeves 52 and 54 as the latter approach their forwardmost, fully extended positions during the operating cycle.

In addition to the actuating rods 128, the upright members 56 also carry an additional pair of more centrally located actuating rods 134 which likewise extend rearwardly and slidingly through the transverse plate 84. Two pairs of switches 136 and 138 are positioned on the top plate 90 for engagement and actuation by the rods 134 in response to reciprocation by the latter.

A pair of laterally outermost rods 140 on opposite sides of the pack 70 extend virtually the full foreand-aft length of the latter and also extend slidingly through the transverse plate 84. Rods 140, however, in contrast to the rods 128 and 134, are attached to the plungers 62 and 64 in the manner illustrated in FIG. 4 for movement with the latter during their reciprocation. Actuating collars 142 on the rear ends of the rods 140 are disposed to engage and actuate switches 144 adjacent the front of the pack 70. Thus, the switches 144 are operated in response to reciprocation of the plungers 62 and 64.

As heretofore explained, the two plungers 62 and 64 work alternately such that while one is pumping product into the conduit 26 controlled by the flapper valve within manifold 24, the other is being loaded with product to begin pumping as soon as the first has completed its full stroke. FIGS. 9–13 are schematic illustrations of the manner in which each plunger 62, 64 operates, the plunger 64 and its associated sleeve 54 being chosen for purposes of illustration.

Assuming first that product has been supplied to the compartment 38 by the hopper 14, the components are in a stand-by position, as illustrated in FIG. 9. Thereupon, the sleeve 54 is pushed forwardly through the compartment 38 until it engages and seals against the rearmost periphery of the funnel 42, as illustrated in FIG. 10. Such advancement of the sleeve 54 causes the latter to slice through the mass of product within the compartment 38 and to effectively load the pumping chamber 54a defined within the sleeve 54.

Thereupon, the plunger 64 is actuated to move forwardly through the sleeve 54 and force the contained products out of the latter through the funnel 42. The flapper valve automatically opens conduit 20 and closes conduit 22 at this time such that the product flows through conduit 20 into the conduit 26 without retrograde movement into the conduit 22. Such pumping is completed by the time the plunger 64 reaches the funnel 42, as illustrated in FIG. 11.

Shortly thereafter, the plunger 64 and sleeve 54 retract in unison from the funnel 42, as illustrated in FIG. 12, and this action operates the flapper valve such as to close conduit 20 and open conduit 22. Such retraction also causes a progressively enlarging void to be formed within the compartment 38 such that product from the hopper 14 is sucked down into the compartment 38 to fill the latter. The cycle is completed when the sleeve 54 and the plunger 64 have returned to their FIG. 9 positions, it being noted that the plunger 64 retracts a short distance relative to the sleeve 54 at the completion of the retraction stroke.

When it is necessary or desirable to sanitize the machine, it is but necessary to retract the sleeves 52, 54 and the plungers 62, 64 to their positions illustrated in FIG. 2 so that the safety switches 126 are actuated by the rods 128. Thereupon, the hydraulic lifting unit 114 may be used to elevate the pack 70, along with the sleeves 52, 54 and the plungers 62, 64, to the cocked position illustrated in phantom in FIG. 2. This provides ready access to the complete interior of the cabinet 10, including the area directly beneath the pack 70 and the sleeves 52, 54. The hopper 14 may be removed by releasing the fasteners 16, whereupon the receptacle 34 may be easily cleaned.

It is to be noted that, contrary to the arrangement in the incorporated patents, the pack 70, both sleeves 52, 54 and both plungers 62, 64, swing as a unit about the common axis 102 when raised to the cocked position. Consequently, the entire machine may be rendered more compact and more easily sanitized than in the past, and the control switches which regulate the sequential and alternate operation of the sleeves 52, 54 and plungers 62, 64, may be consolidated as part of the pack 70. Moreover, by utilizing the spherical bearings 94 which are coaxially aligned with the plungers 62 and 64 behind the latter, the hinge points for the pack 70 are located at the most desirable locations to assure structural stamina and long-lived machine operation.

Having thus described the invention, what is claimed as new and desired to be secured by Letters Patent is:

1. In a machine for the continuous pumping of plastic materials:

an elongated, open-top cabinet, having a receptacle supported therein at one end thereof, said receptacle having dual, laterally spaced sets of axially aligned inlets and outlets below the open top of the cabinet which communicate the receptacle with internal and external portions of the cabinet, respectively;

a materials supply hopper mounted above said receptacle for feeding materials downwardly into the latter through the open top of the cabinet;

a pair of alternately reciprocable, pump chamber-defining sleeves in the cabinet each aligned with a corresponding inlet and outlet and movable through its inlet between a rectracted position substantially outside of the receptacle and an extended position sealing off the hopper from further materials supply;

a plunger for each of said sleeves, respectively, said plungers being alternately reciprocable through their corresponding sleeves for pushing successive charges of materials from alternate ones of said outlets when their sleeves are extended and loaded with materials from the hopper;

an operating and control pack in the cabinet behind the plungers and sleeves for moving the same through their respective operating cycles in timed relationship with one another so as to effect substantially continuous pumping of materials from the machine, said pack including a power device for each of said plungers and each of said sleeves, respectively; a plurality of limit switches for controlling reciprocation of the plungers and their sleeves; actuating structure associated with said plungers and sleeves for engaging and operating said switches during reciprocation of the plungers and sleeves; and a frame common to said plungers, said sleeves, said power devices, said switches and said structure; and means mounting said frame for vertical swinging movement about a horizontal axis between lowered and raised positions, said frame joining said plungers, said sleeves, said power devices, said switches and said actuating structure together for swinging thereof as a unit about said axis for locating the plungers and sleeves in alignment with their respective inlets when the frame is in said lowered position and for projecting the plungers and sleeves accessibly through the open top of the cabinet when the frame is in said raised position, said cabinet including an open rectangular section behind said receptacle defining a longitudinally and transversely unobstructed cavity extending between the rear wall of the cabinet and the receptacle on the one hand, and the two lateral sides of the cabinet on the other hand, said cavity receiving said pack, said plungers and said sleeves for movement thereof about said axis between said positions, said frame including a front transverse plate spanning said cavity from top to bottom and from said to side thereof between the pack and said plungers and sleeves so as to subdivide the cavity into a pair of unobstructed subcavities on opposite fore-and-aft sides of the plate when the plungers, sleeves and power pack are in said lowered position whereby to facilitate cleanup of the machine.

2. In a machine as claimed in claim 1, wherein said structure includes actuator rods extending rearwardly from said plungers and sleeves.

3. In a machine as claimed in claim 1, wherein each of said power devices is fluid pressure-operated.

4. In a machine as claimed in claim 1; and a lifting unit coupled with said pack for effecting said swinging thereof.

5. In a machine for the continuous pumping of plastic materials:
- an elongated, open-top cabinet, having a receptacle supported therein at one end thereof,
- said receptacle having dual, laterally spaced sets of axially aligned inlets and outlets below the open top of the cabinet which communicate the receptacle with internal and external portions of the cabinet, respectively;
- a materials supply hopper mounted above said receptacle for feeding materials downwardly into the latter through the open top of the cabinet;
- a pair of alternately reciprocable, pump chamber-defining sleeves in the cabinet each aligned with a corresponding inlet and outlet and movable through its inlet between a retracted position substantially outside of the receptacle and an extended position sealing off the hopper from further materials supply;
- a plunger for each of said sleeves, respectively,
- said plungers being alternately reciprocable through their corresponding sleeves for pushing successive charges of materials from alternate ones of said outlets when their sleeves are extended and loaded with materials from the hopper;
- an operating and control pack in the cabinet behind the plungers and sleeves for moving the same through their respective operating cycles in timed relationship with one another so as to effect substantially continuous pumping of materials from the machine,
- said pack including a power device for each of said plungers and each of said sleeves, respectively; a plurality of limit switches for controlling reciprocation of the plungers and their sleeves; actuating structure associated with said pistons and sleeves for engaging and operating said switches during reciprocation of the pistons and sleeves; and a frame common to said plungers, said sleeves, said power devices, said switches and said structure; and
- means mounting said frame for vertical swinging movement about a horizontal axis between lowered and raised positions.
- said frame joining said plungers, said sleeves, said power devices, said switches and said actuating structure together for swinging thereof as a unit about said axis for locating the plungers and sleeves in alignment with their respective inlets when the frame is in said lowered position and for projecting the plungers and sleeves accessibly through the open top of the cabinet when the frame is in said raised position,
- said frame including a pair of laterally spaced studs extending rearwardly from the rearmost ends of the power devices for said plungers in coaxial alignment therewith,
- said mounting means including a pair of spherical bearings for said studs,
- each of said bearings being rigidly affixed to its corresponding stud and being journaled by the end of the cabinet opposite said receptacle for coaxial registration with said studs, said plungers, said power devices therefor, said inlets and said outlets when said frame is in its lowered position whereby the thrust from said power devices for the plungers is directed to the center of said bearings along said coaxial path.

* * * * *